(12) United States Patent
Lee et al.

(10) Patent No.: US 7,758,672 B2
(45) Date of Patent: Jul. 20, 2010

(54) APPARATUS OF OXYGEN CONCENTRATION SYSTEM AND METHOD THEREOF

(75) Inventors: Tae Soo Lee, Gyeonggi-do (KR); Yoon Sun Choi, Seoul (KR); Yong Duck Kim, Gyeonggi-do (KR)

(73) Assignee: Oxus Co., Ltd. (KR)

( * ) Notice: Subject to any disclaimer, the term of this patent is extended or adjusted under 35 U.S.C. 154(b) by 755 days.

(21) Appl. No.: 11/601,206

(22) Filed: Nov. 17, 2006

(65) Prior Publication Data

US 2007/0169623 A1    Jul. 26, 2007

(30) Foreign Application Priority Data

Jan. 26, 2006   (KR) .................. 10-2006-0008516
May 24, 2006   (KR) .................. 10-2006-0046611

(51) Int. Cl.
*B01D 53/02*    (2006.01)

(52) U.S. Cl. .............................. 95/96; 95/148; 96/130; 128/205.12; 128/205.27

(58) Field of Classification Search .................... 95/96, 95/100, 103, 148; 96/130; 128/205.12, 205.27
See application file for complete search history.

(56) References Cited

U.S. PATENT DOCUMENTS 5,997,617 A *   12/1999   Czabala et al. ................ 96/130

* cited by examiner

*Primary Examiner*—Robert A Hopkins
(74) *Attorney, Agent, or Firm*—Park & Associates IP Law LLC

(57) ABSTRACT

The present invention relates to an apparatus and process for oxygen concentration that makes possible the production of highly purified concentrated oxygen by modifying the structure of the adsorption bed and with various valves coupled thereto, and which can increase purity of the oxygen produced and reduce mechanical energy and consumption of electricity of the air compressor.

15 Claims, 16 Drawing Sheets ent used.

APPARATUS OF OXYGEN CONCENTRATION SYSTEM AND METHOD THEREOF

CROSS-REFERENCE TO RELATED APPLICATIONS

This application claims the benefit of Korean Patent Application No. 10-2006-0046611, filed in the Korean Intellectual Property Office on May 24, 2006 and 10-2006-8516, filed in the Korean Intellectual Property Office on Jan. 26, 2006 the disclosure of which is incorporated herein by reference.

BACKGROUND OF THE INVENTION

1. Field of the Invention

The present invention relates to an apparatus and process of oxygen concentration system that makes possible the production of highly purified concentrated oxygen by modifying the structure of the adsorption bed.

2. Description of Related Art

In general, a conventional oxygen concentration apparatus uses an adsorbent, called Zeolite, which adsorbs gas molecules. Since the nitrogen which constitutes about 80% of the atmospheric air, is easily absorbed with Zeolite, when the air is compressed and infused into an adsorption bed containing the adsorbent, the nitrogen component is absorbed and the air from which the nitrogen component is reduced, is output through the upper outlet of the adsorption bed; this process supplies the output oxygen for the required place and use.

The oxygen concentration process in the apparatus, can be distinguished into two processes: an adsorption process in which the compressed air passes through the absorbent and the nitrogen is absorbed, and a process of cleansing the adsorbent used.

In the adsorption process, as the compressed air is passed through the absorbent only the nitrogen is absorbed and the remaining gas is passed to separate the oxygen from the compressed air. In continuous use, the efficiency of the absorbent, Zeolite, becomes markedly reduced and the original capacity of the absorbent must be regained by desorbing the absorbed nitrogen from the absorbent.

The oxygen produced by the absorption of nitrogen within the absorbent moves into a storage place when it reaches a predetermined pressure and it is maintained in storage in a considerably high pressure. A portion of the stored oxygen is then regurgitated into the absorbent and performs the nitrogen cleansing process so as to regain absorption capacity.

However, the conventional oxygen concentration apparatus generally contains complicated inner and outer structures to produce high purity concentrated oxygen and has drawbacks of increased production cost, decreased productivity and failure to function.

Also, to produce oxygen, the conventional oxygen concentration apparatus, contains an interior absorption column in which its upper and lower portions are interchanneled mutually. Because only evenness of either the upper portion or the lower portion can be operated at one time, the pressure preparation time, consumption of electricity, purity, pure oxygen enrichment, and its recovery rate can be problematic and unsatisfactory in the event.

In Addition, when the air compressor connected to the oxygen concentration apparatus operates, too much mechanical energy is consumed, causing a disadvantage in the management of the oxygen concentration apparatus, and furthermore increasing the noise of the nitrogen output.

SUMMARY OF THE INVENTION

One object of the present invention is to solve the above mentioned problem in which the structure is altered to have a single absorption bed to be capable of producing highly purified and concentrated oxygen and to provide an oxygen concentration apparatus capable of easily attaching and detaching a solenoid valve on the adsorption bed. During the oxygen concentration process, after the first and second evenness of the adsorption column is performed, serially, the first and second upper/lower evenness is performed, thus the other object of the invention is to provide an oxygen concentration method to produce concentrated oxygen with high purity and while reducing the consumption of electricity by the air compressor as possible as it can be used.

BRIEF DESCRIPTION OF THE DRAWINGS

A more complete appreciation of the invention, and its many advantages can be gained and better understood by referencing the following detailed description and accompanying drawings wherein.

DETAILED DESCRIPTION OF THE INVENTION

Figure 1:
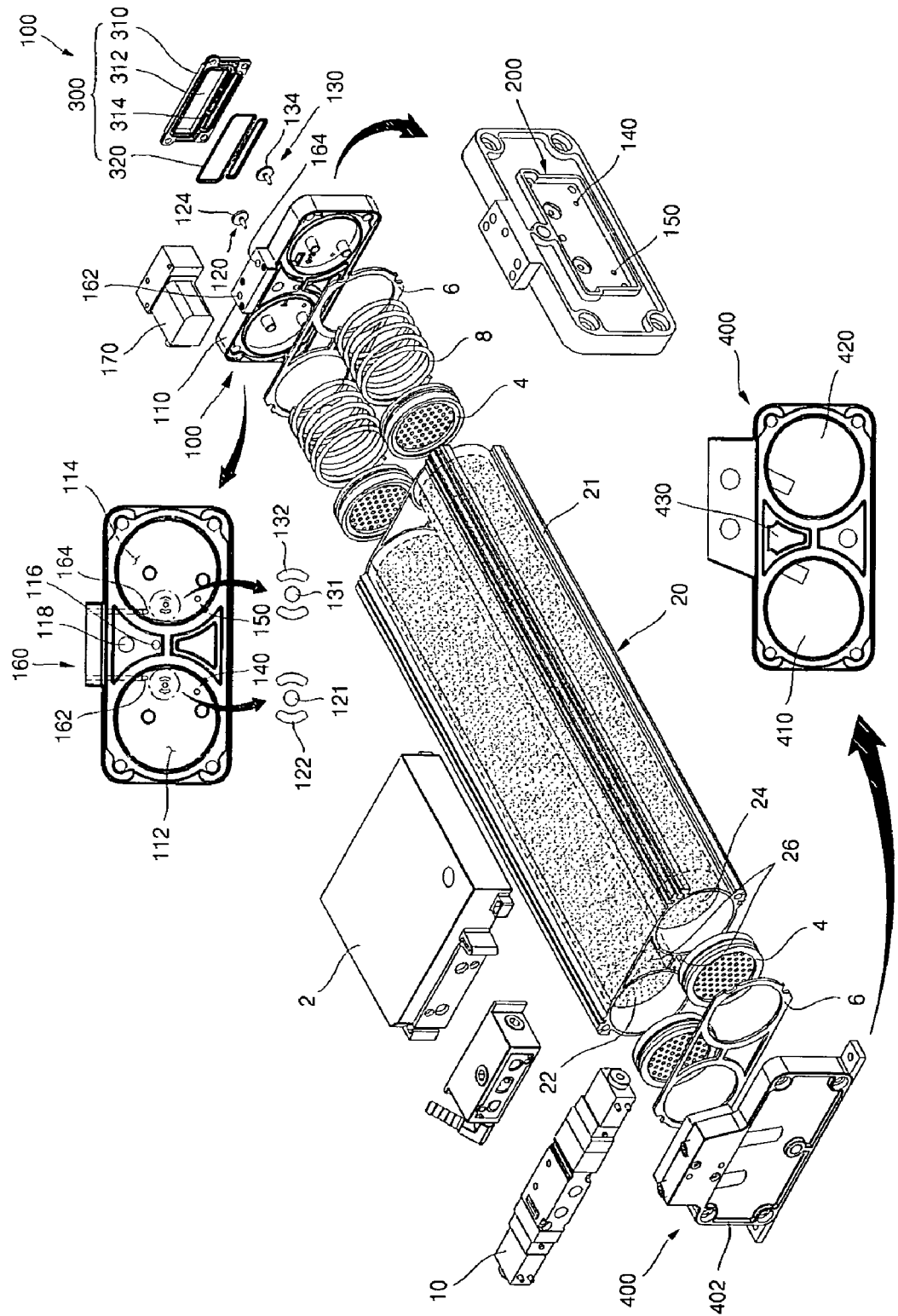
FIG. 1 is a disassembled perspective view of an apparatus of the oxygen concentration system according to a preferred embodiment of the present invention.
Figure 2:
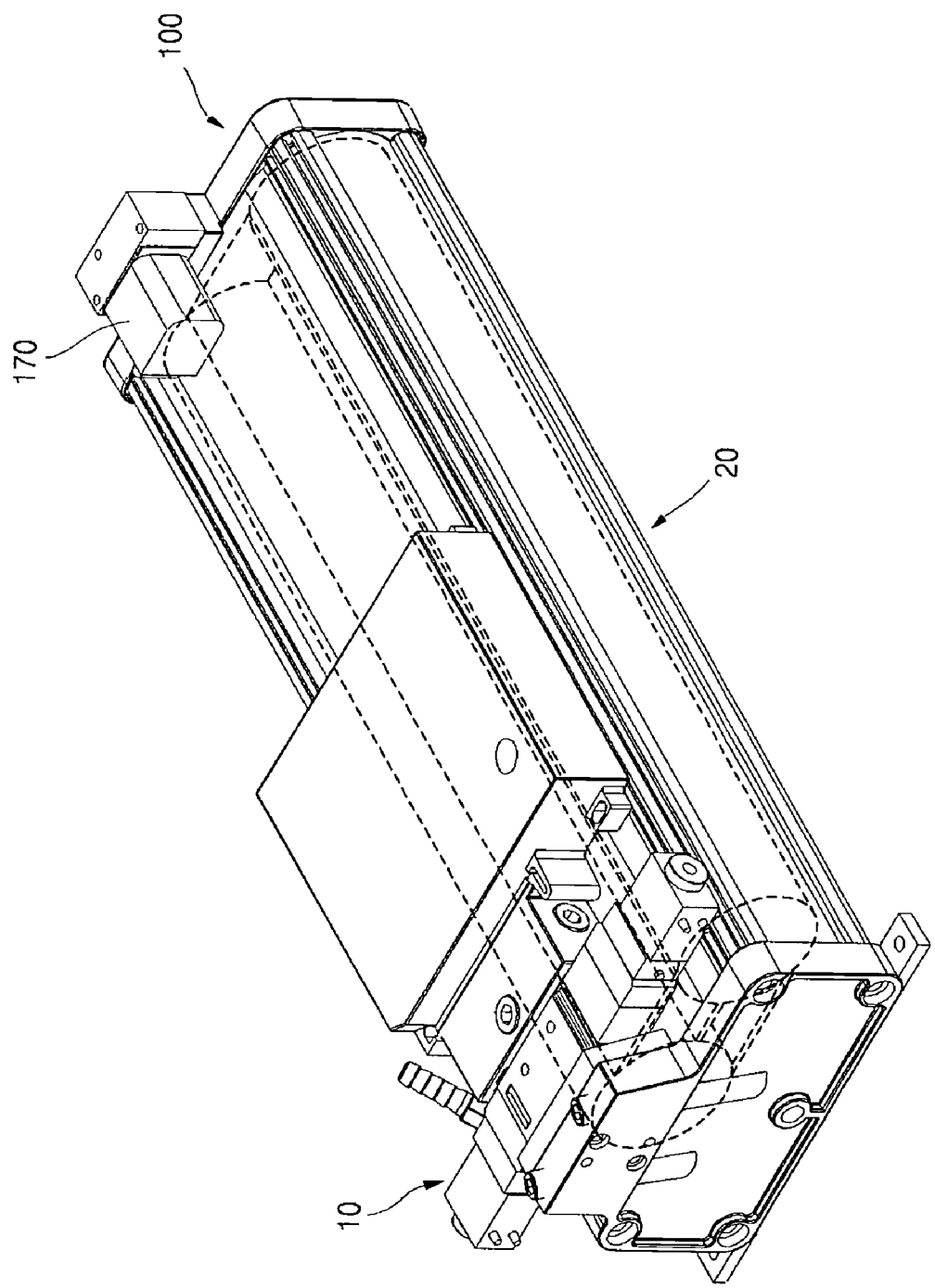
FIG. 2 is a perspective view of an assembled apparatus of the oxygen concentration system according to the preferred embodiment of the present invention.
Figure 3:
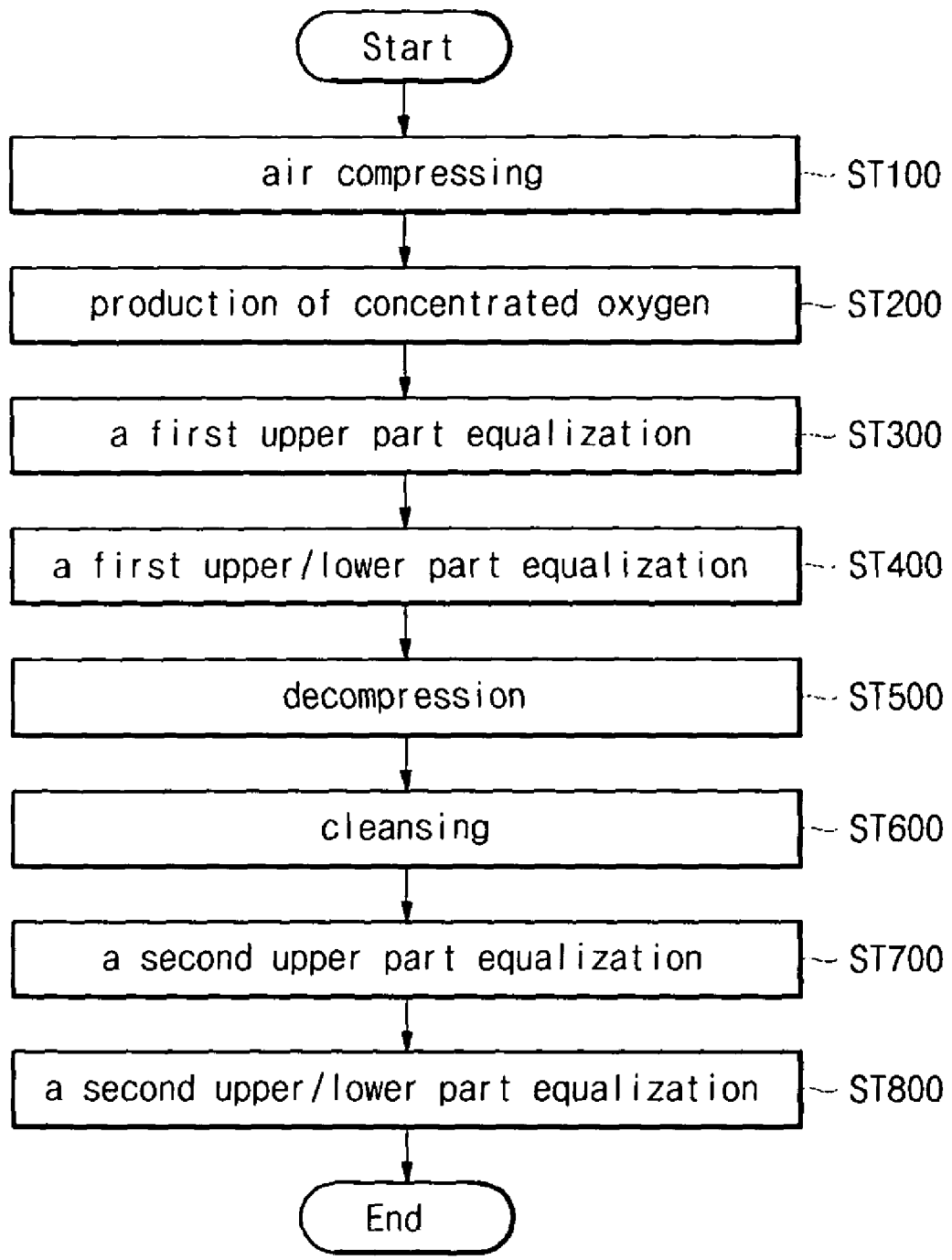
FIG. 3 is a process flow chart of an oxygen concentration method according to one preferred embodiment of the present invention.
Figure 4A:
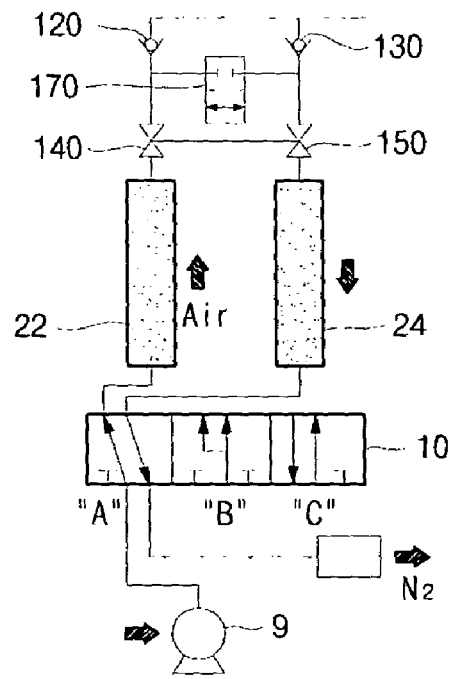
FIG. 4a to FIG. 4h are circuit diagrams showing the air pressure circuits of an operating state of each step of the oxygen concentration method according to the preferred embodiment of the present invention.
Figure 4B:
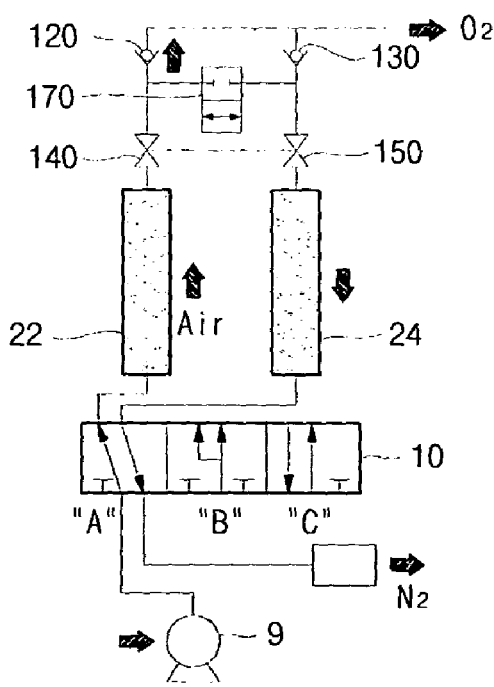
Figure 4C:
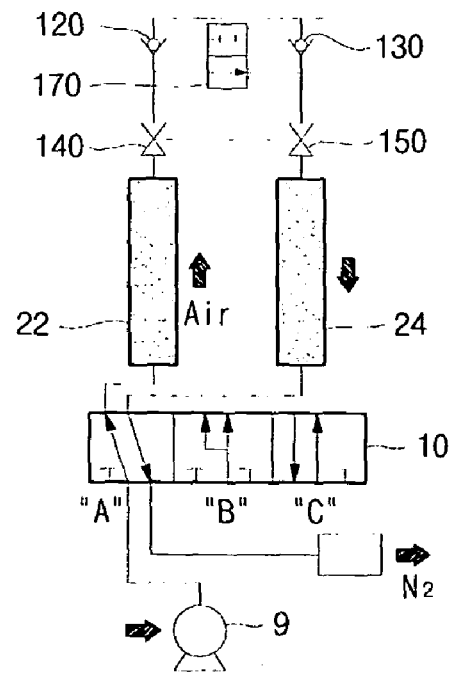
Figure 4D:
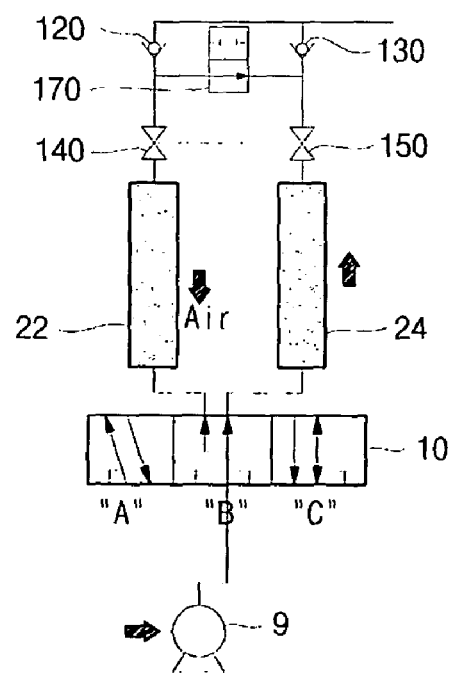
Figure 4E:
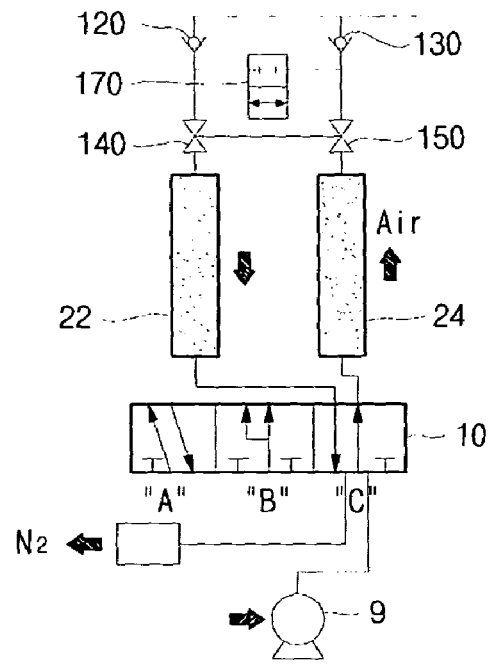
Figure 4F:
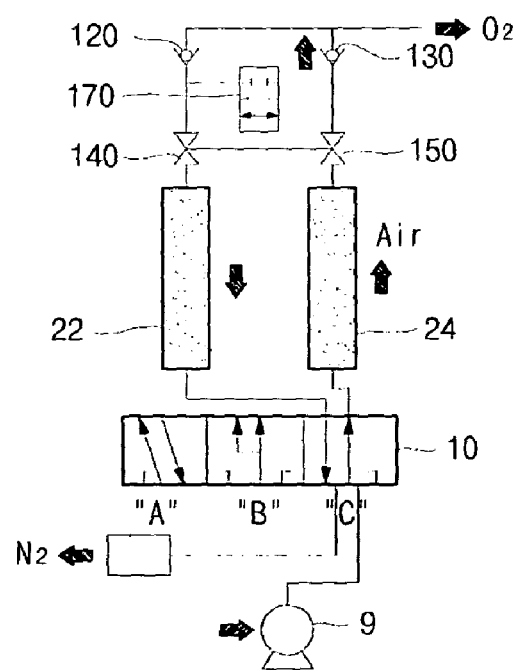
Figure 4G:
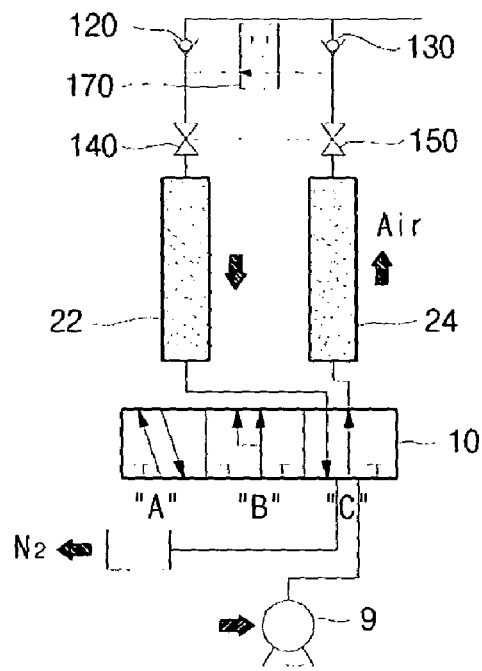
Figure 4H:
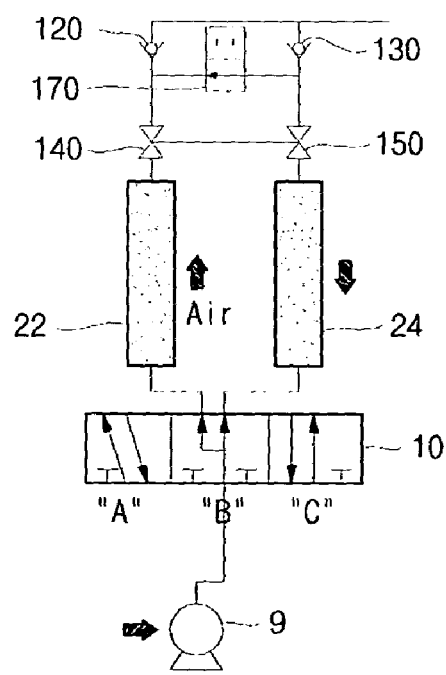

Hereinafter, the present invention will be described in detail with reference to the accompanying drawings in which like reference symbols indicate the same or similar components.

A first solenoid valve is mounted on the outside of a bed housing to supply and/or discharge compressed air, and an adsorption bed is provided with an oxygen reservoir to store the concentrated oxygen.

First and second adsorption columns are disposed in the adsorption bed to separate the nitrogen and oxygen in the compressed air which is supplied through the first solenoid valve. First and second cover assemblies are mounted on the upper and lower parts of the adsorption bed respectively, in which the first cover assembly includes first and second grooves formed at positions corresponding to the first and second adsorption columns on the inside surface of the first cover plate, and first and second check valves are installed to allow movement of the concentrated oxygen through the supplying hole communicating with the oxygen reservoir of the adsorption bed and are formed at the same position of the first and second grooves.

A fitting or mounting part is provided on the outside upper part of the first cover plate with an end communicating with the inside of the first and second grooves each other and another end is formed on inside of the first and second communicating hole extending to the outside of the first cover assembly.

A second solenoid valve is fixedly mounted on the mounting part and coupled in fluid communication with the first and second communicating holes operable to equalize the pressure of the first and second adsorption columns, and a chamber is installed on the outside of the first cover plate, in fluid communication with the supplying hole with gas supplied through the first and second check valves.

The first cover assembly includes, on the lower sides of the first and second check valves, a first and second orifice in fluid communication with the first and second adsorption columns to allow a portion of the concentrate oxygen to flow reversely, when the pressure of any one of the first and second adsorption columns gets higher and the pressure of the other one is lowered, in order to rinse or clean the adsorbed nitrogen in any one of the first and second adsorption columns.

The first and second check valves and the supply hole are disposed on the region of chamber, positioned on the same line, and the first and second orifices are disposed, on the lower side of the first and second check valves and supply hole, on the region of chamber while positioned on the same line.

The first and second check valves are mounted on a fixing hole formed on the first cover plate, and include a valve hole formed on both sides of the fixing hole in fluid communication, and a valve body of flexible material which is operable with flexibility by the pressure of moving gas via the valve hole.

A chamber cover includes the first chamber formed on the inside of the chamber cover body on the chamber of the first cover assembly, which is compartmented with the close sealed region from outside; and the second chamber formed on the lower side of the first chamber, which is compartmented with a close sealed region from the outside and allows the gas supplied through the first orifice and the second orifice to flow.

The chamber cover includes a sealing element disposed along the external edge of the first and second chambers formed on the body of chamber cover and positioned with an engaged state on the external peripherals of the chamber.

The second cover assembly includes the third and fourth grooves formed corresponding to the first and second adsorption columns on the inside surface of the second cover plate, and a connecting hole is penetratingly formed between the third and fourth grooves and communicating with the oxygen reservoir of the adsorption bed.

The first solenoid valve is preferred to use a 5 port 3 way solenoid valve or 3 port 2 way solenoid valves.

The second solenoid valve is preferred to use a 2 port 2 way solenoid valve.

The process of oxygen concentration according to the preferred embodiment of the present invention includes a step of compressing the external air supplied to the first adsorption column of the adsorption bed through the air compressor; a step of production of the concentrated oxygen in the time of same pressure in both the inside of the adsorption bed and the first adsorption column as the nitrogen substance included in the compressed air is adsorbed in the first adsorption column; a step of the first upper part equalization to equalize the upper part pressure of the first and second adsorption columns, by supplying the compressed gas supplied on the first adsorption column to the second adsorption column, which is included in inside of the adsorption bed, after production of the concentrated oxygen on the first adsorption column; a step of the first upper/lower part equalization accomplished with the first and second adsorption columns to equalize with the first upper part equalization and lower part equalization concurrently, by supplying the external air supplied with the step of first upper part equalization through the lower part of the first adsorption column through the lower part of the second adsorption column;

The process further includes a step of decompression in which the first adsorption column reduces the pressure without supplying the compressed external air to the first adsorption column while supplying the compressed external air to the second adsorption column inside of the adsorption bed and elevating the internal pressure through the air compressor; a step of cleansing, accomplished with desorption and rinsing with the pressure of the first adsorption column in the state of decompressed nearly to the atmospheric pressure, wherein the nitrogen substance containing in the compressed air is adsorbed on the second adsorption column and a high concentrated oxygen is produced in the time of same pressure in both the adsorption bed and the second adsorption column; a step of equalization of the second upper part, wherein the supplied compressed gas on the second adsorption column is supplied to the first adsorption column installed inside the adsorption bed after the producing of concentrated oxygen at the second adsorption column to equalize the upper part pressure of the first and second adsorption column; and a step of second upper/lower part equalization accomplished concurrently with the lower part equalization and the second upper part equalization of the first and second adsorption columns with the second upper equalization step, by supplying external air supplied through the lower part of the second adsorption column through the lower part of the first adsorption column.

The step of production of the concentrated oxygen includes a step of storing concentrated oxygen where the high concentrated oxygen produced on the first adsorption column is stored within the adsorption bed.

The step of the first and the second upper/lower part equalization is carried as the pressure of the first adsorption column is lowered rapidly and the pressure of the second adsorption column is elevated rapidly and thus, the pressure of the first and second adsorption columns reaches to the same pressure.

The step of the first upper/lower part equalization is accomplished concurrently and continuously when the step of the first upper part equalization is established.

The step of the second upper/lower part equalization is accomplished concurrently and continuously when the step of the second upper part equalization is established.

Next, the present invention will be described in more detail in connection with several examples, however, the present invention is not limited by the examples.

As illustrated in FIG. 1 to FIG. 6, the apparatus of oxygen concentration system according to the present invention includes a first solenoid valve 10 mounted on the outside of bed housing 21 which is able to supply and/or discharge the compressed air, the first and second adsorption columns 22 and 24 disposed in the adsorption bed 20 to separate the nitrogen and oxygen in the compressed air supplying through the first solenoid valve 10 and the adsorption bed 20 is provided with an oxygen reservoir 26 to store the concentrated oxygen.

The adsorption bed 20 is a single adsorption bed and the first and second adsorption columns 22 and 24 are disposed in parallel position and formed as a tube type in the inside in a lengthwise direction, then, the oxygen reservoir 26 is provided to store the concentrated oxygen in the inner of the bed housing 21.

The first solenoid valve 10, mounted on the external upper part of the adsorption bed 20, is preferred to use a 5 port 3 way solenoid valve or plural 3 port 2 way solenoid valves and configured to operate to supply and discharge the compressed air produced by the air compressor 9 compressing the air to a pressure over the atmospheric pressure.

An exhaust silencer 2 is mounted on the outside of the adsorption bed 20 to prevent noise produced from the nitrogen gas exhausting from the first adsorption column 22 and second adsorption column 24.

First and second cover assemblies 100 and 400 are mounted to the upper and lower parts of the adsorption bed 20 respectively. The first cover assembly 100 includes first and second grooves 112 and 114 which are formed on the inside surface of the first cover plate 110 corresponding to the locations of the first and second adsorption column 22, 24.

First and second check valves 120 and 130 are mounted to the first groove 112 and second groove 114, in order to allow the concentrated oxygen produced in the first adsorption column 22 a with the oxygen reservoir 26 of the adsorption bed 20. An oxygen exhaust hole 118 is formed on the upper side of the supply hole 116 to connect with a tube (not shown) to a tube line (not shown) for supplying the concentrated oxygen.

The first and second check valves 120 and 130 are installed on the fixing holes 121 and 131 formed on the first cover plate 110, while, valve holes 122 and 132 are formed on both side of the fixing holes 121 and 131 isolating each other to allow the flow of gas.

The first and second check valves 120 and 130 include the valve body 124 and 134 which operate flexibly by the pressure of gas through the valve holes 122 and 132.

First orifice 140 and second orifice 150 are formed at lower sides of the first and second check valves 120 and 130 on the first and second grooves 112 and 114 of the cover plate 110, thus, when the pressure of either the first and second adsorption columns 22 or 24 is increased and the pressure of the other one is decreased, the absorbed nitrogen of one of the first and second adsorption columns 22 and 24 is able to be cleansed with a portion of the concentrated oxygen reversely flowed to the first and second adsorption columns 22 and 24.

A fitting or mounting part 160 is incorporated on an upper outside portion of the first cover plate 110 in which the mounting part 160 includes first and second through holes 162 and 164 which extend from inside of the first and second grooves 112 and 114 to the outside of the first cover assembly 100.

Second solenoid valve 170 is coupled in fluid communication with the first and second through holes 162 and 164 and mounted on the fitting part 160 to enable a (partial) pressure equalization of the first and second adsorption columns 22 and 24. The second solenoid valve 170 preferably a 2 port 2 way type solenoid valve.

The solenoid valve 170 is fixed by fixing screws to the screw holes formed on the fitting part 160.

Chamber part 200 is constructed on the outside of the first cover plate 110 to compart separately the first and second check valves 120 and 130 and the first and second orifices 140 and 150.

The first and second check valves 120 and 130 and supply hole 116 are disposed on the same line in the chamber part 200. The first and second orifices 140 and 150 are positioned on the lower sides of the check valves 120 and 130 and the supply hole 116 and are disposed on the same line in the chamber part 200.

A chamber cover 300 is mounted on the chamber part 200 of the first cover assembly 100 and a first chamber 312 is formed on the inside of the chamber cover body 310 with a compartment to separate a closely sealed region from the outside, so that the supplied gas from the first check valve 120 or second check valve 130 can flow to the supply hole 116.

A second chamber 314 is formed on a lower side of the first chamber 312 with compartment to separate a closely sealed region the outside and the gas supplied through the first orifice 140 or second orifice 150 can communicate there-through.

A sealing element 320 is fitted along the outer edge of the first and second chambers 312 and 314 formed on the chamber cover body 310 and engaged with the outer peripheries of the chamber part 200.

A cap plate 4 having multiple through holes is mounted on each upper and lower end of the first and second adsorption columns 22 and 24 which are installed inside of the adsorption bed 20, to make the concentrated oxygen produced from the first adsorption member 22 or second adsorption member 24 flow evenly with the same flow velocity due to the through holes formed on the cap plate 4.

A filter (not shown) is fitted between the cap plate 4 and the first and second adsorption columns 22 and 24 to prevent leakage of zeolite grain contained inside of the first and second adsorption columns 22 and 24 and to filter the compressed air supplied from the air compressor 9.

The packing elements 6 are fitted on the inside of both the first cover assembly 100 and second cover assembly 400. The spring 8 is interposed between the first cover assembly 100 and the cap plate 4. Because the volume of zeolite contained in the first and second adsorption columns 22 and 24 reduces over time, the spring 8 is installed to press the first and second adsorption columns 22 and 24.

The second cover assembly 400 includes the third and fourth grooves 410 and 420, which are formed displacedly on the inner surface of the second cover plate 400 and correspond to the first and second adsorption columns 22 and 24, and also includes connecting hole 430, which is formed between the third and fourth grooves 410 and 420, and is in fluid communication with the oxygen reservoir 26 of the adsorption bed 20.

The second cover assembly 400 is constructed to allow the compressed air, supplied via the first solenoid valve 10 to the inside of the second cover plate 400, to be supplied to the first adsorption column 22 or second adsorption column 24.

The Operation process of the oxygen concentration system according to the preferred embodiments of the present invention includes:

A step (ST100) of compressing the external air supplied to the first adsorption column 22 of the adsorption bed 20 by the air compressor 9; a step (ST200) of producing the concentrated oxygen in the time of same pressure in both the insides of the adsorption bed 20 and the first adsorption column 22 as the nitrogen, included in the compressed air is adsorbed in the first adsorption column 22; a step (ST300) of equalization for the first upper part to equalize the upper part pressure of the first and second adsorption columns 22 and 24, by supplying the compressed gas supplied on the first adsorption column 22 to the second adsorption column 24 of the adsorption bed 20 after production of the concentrated oxygen in the first adsorption column 22; a step (ST400) of equalization for the first upper/lower parts, which is accomplished with the first and second adsorption column 22, 24 to equalize with the first upper part equalization (ST300) and lower part equalization concurrently, as the external air supplied by the step of first upper part equalization (ST300) through the lower part of the first adsorption column 22 is supplied to the lower part of the second adsorption column 24.

The process further includes: a step (ST500) of decompression in which the first adsorption column 22 reduces the pressure by not supplying the compressed external air to the first adsorption column 22 while supplying the compressed external air to the second adsorption column 24 of the adsorption bed 20 and elevating the internal pressure of the second adsorption column 24; a step of cleansing (ST600) accomplished with desorption and rinsing with the pressure of the first adsorption column 22 in the state of decompressed nearly to the atmospheric pressure, wherein the nitrogen substance containing in the compressed air is adsorbed in the second adsorption column 24 and producing a high concentrated oxygen in the time of same pressure in both the adsorption bed 20 and the second adsorption column 24; a step of equalization of the second upper part (ST700), wherein the supplied compressed gas on the second adsorption column 24 is supplied to the first adsorption column 22 installed inside the adsorption bed 20 after the producing of concentrated oxygen at the second adsorption column 24 to equalize the upper part pressure of the first and second adsorption columns 22 and 24; and a step of second upper/lower part equalization (ST800) accomplished concurrently with the lower part equalization and the second upper part equalization of the first and second adsorption columns 22 and 24 as the eternal air supplied by the second upper equalization step (ST700) through the lower part of the second adsorption column 24 is supplied through the lower part of the first adsorption column 22.

The step of production of the concentrated oxygen (ST200) can include a step of storing of concentrated oxygen (ST210) where the high concentrated oxygen produced on the first adsorption column 22 is stored within adsorption bed 20.

The step of the first and the second upper/lower part equalizations (ST400, ST800) are accomplished with the pressure of the first adsorption column 22 lowered rapidly and the pressure of the second adsorption column 24 elevated rapidly, and thus first and second adsorption columns 22 and 24 reach the same pressure at any second.

The first upper/lower part equalization (ST400) is accomplished concurrently and continuously when the step of the first upper part equalization (ST300) is established.

The step of the second upper/lower part equalization (ST800) is accomplished concurrently and continuously when the step of the second upper part equalization (ST700) is established.

The operating state according to the present invention is described with reference to the drawings;

As illustrated in FIG. 1 to FIG. 5h, the apparatus of oxygen concentration system according to the present invention, the purity of concentrated oxygen is increased, and reciprocated the 8 steps of pressurization of air: a step of air compressing (ST100), production of concentrated oxygen: a step of production of the concentrated oxygen (ST200), the first upper part equalization: a step of the first upper part equalization (ST300), the first upper/lower part equalization: a step of the first upper/lower part equalization (ST400), depressurize: a step of decompression (ST500), cleansing: a step of cleansing (ST600), the second upper part equalization: a step of equalization of the second upper part (ST700), the second upper/lower part equalization, a step of second upper/lower part equalization (ST800) to improve the purity of concentrated oxygen, recovery of the mechanical energy of the air compressor simultaneously with decreasing the electric power consumption.

Figure 5A:
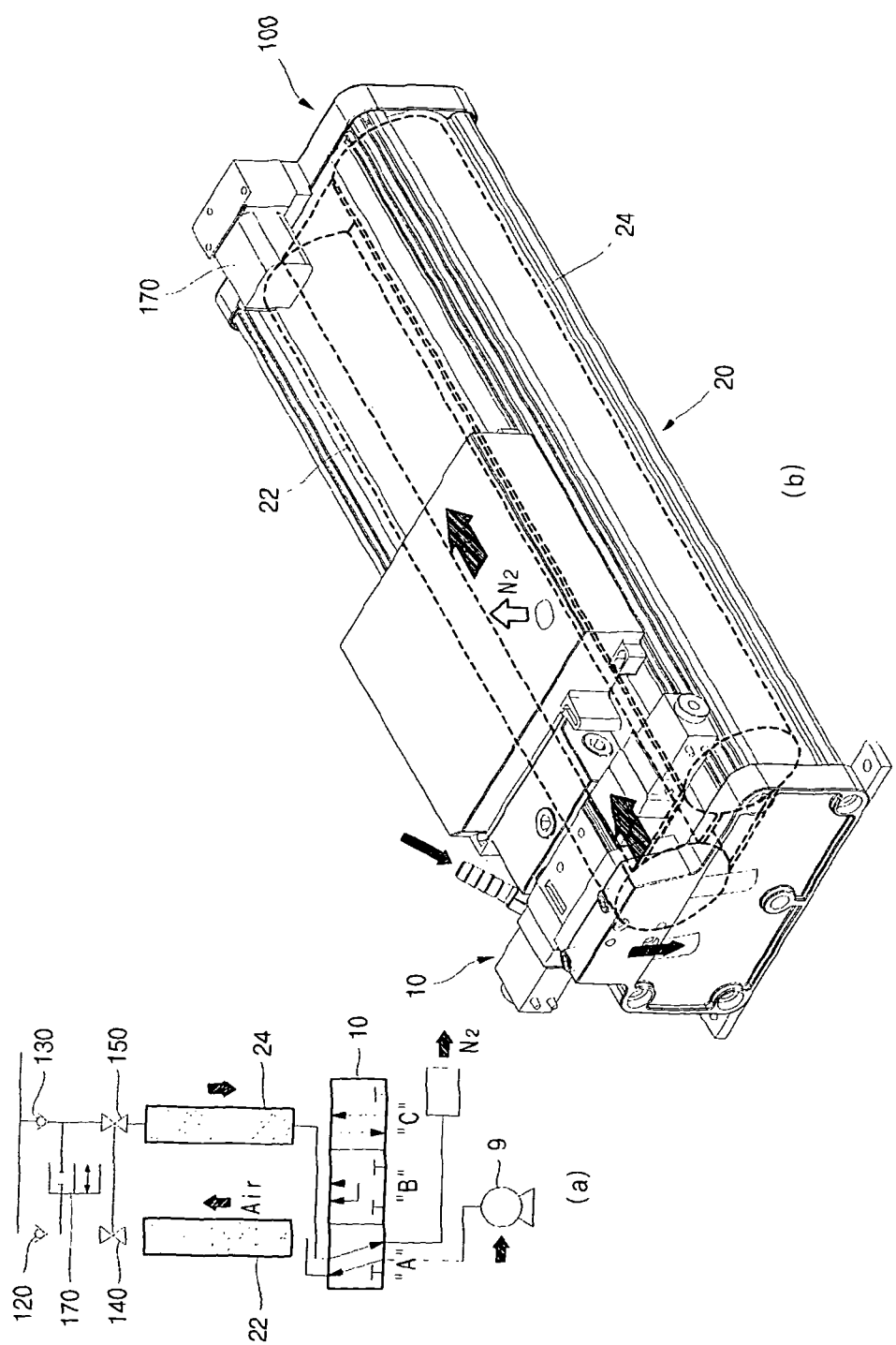
FIG. 5a to FIG. 5h are views illustrating operating states of the oxygen concentration apparatus according to one preferred embodiment of the present invention.

FIG. 5a illustrates the operating state of an apparatus of the oxygen concentration system according to the preferred embodiment of the present invention, in which FIG. 5a(a) illustrates the air pressure circuit line showing the compressed air flow in the oxygen concentration system, and FIG. 5a(b) is a view illustrating the gas flow in the oxygen concentration system.

As illustrated in FIG. 5a(a), compressed air produced from the air compressor 9 is supplied to the first solenoid valve 10 with the first and second check valves 120 and 130 closed (see FIG. 1).

As illustrated in FIG. 5a (b), the air produced from the air compressor 9 through the stage (A) of solenoid valve 10, compresses (ST100) in the first adsorption column 22, and does not supply to the second adsorption column 24 (by off state of the stage (C) side of the first solenoid valve 10) and is depressurized step by step, with the second solenoid valve 170 maintained the state of closing in this time.

Figure 5B:
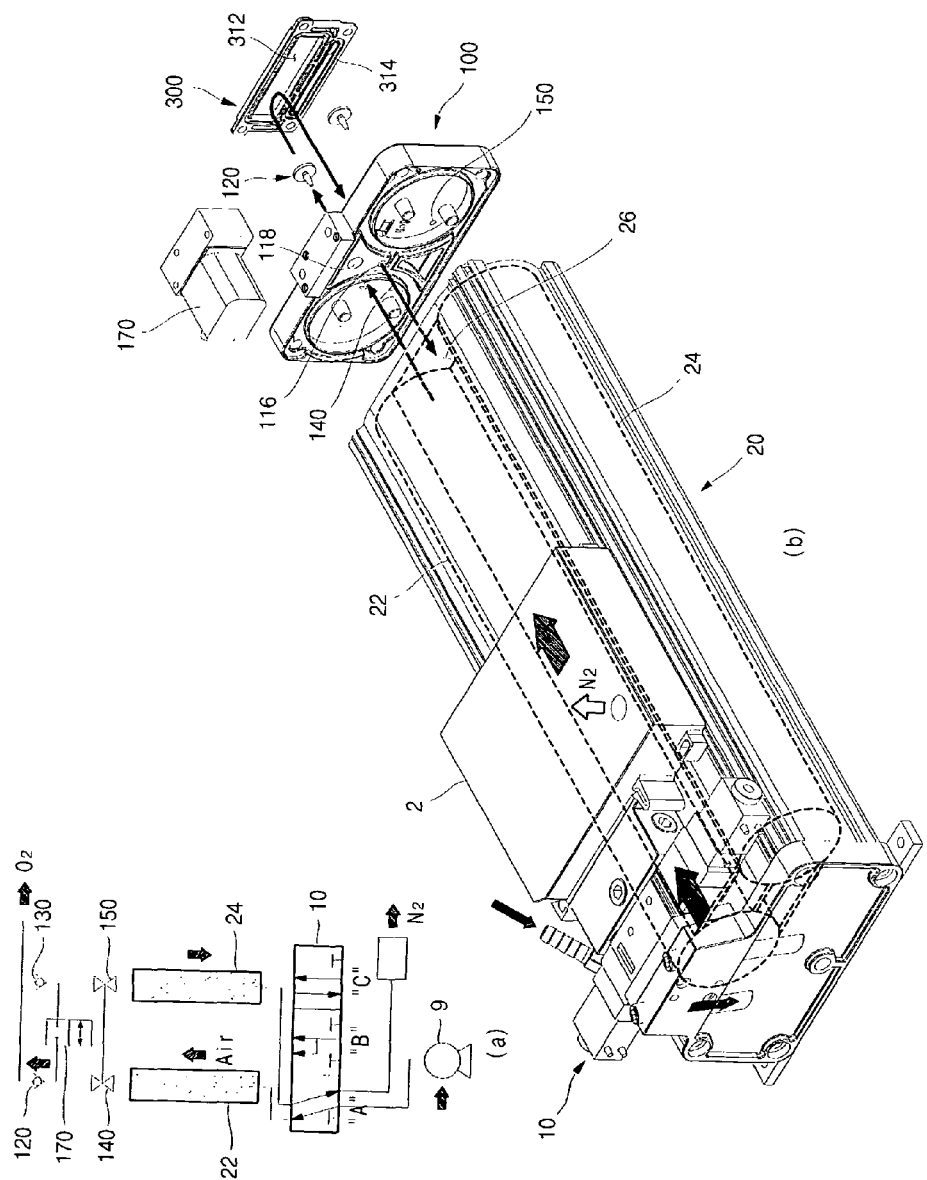

As illustrated in FIG. 5b, the compressed air from the air compressor 9 is supplied the first adsorption column 22 continuously, while the nitrogen substance contained in the compressed air is adsorbed by zeolite in the first adsorption column 22, and thus, the concentrated oxygen is produced (ST200) and supplied through the tube (not shown) connecting with the oxygen exhaust hole 118 separately.

The first check valve 120 in the first cover plate 110 (see FIG. 1) is opened by the pressure of concentrated oxygen, in the time of the pressure of first adsorption column 22 is same as the inside pressure of the oxygen reservoir 26 and high purity concentrated oxygen flows to in the first chamber 312 of chamber part 200 (see FIG. 1) via the valve hole 122 (see FIG. 1) of the first check valve 120.

The concentrated oxygen in the first chamber 312 is stored (ST210) in the oxygen reservoir 26 of the adsorption bed 20 via the supply hole 116 without leakage by the sealing element 320 (see FIG. 1) of the chamber cover 300, while a part of the concentrated oxygen, produced in the first adsorption part 22, flows via the first orifice 140 formed on the first groove 112 (see FIG. 1) of the first cover plate 110 and is supplied to the second chamber 314 of the chamber part 200 (see FIG. 1).

A portion of concentrated oxygen supplied to the second chamber 314 is supplied to the second adsorption column 24 via the second orifice 150.

As described above, the concentrated oxygen, supplied to the second adsorption column 24, cleanses the nitrogen substance adsorbed in zeolite included in the second adsorption column 24 while exhausting the nitrogen through the exhaust silencer 2 connecting with first solenoid valve 10.

Figure 5C:
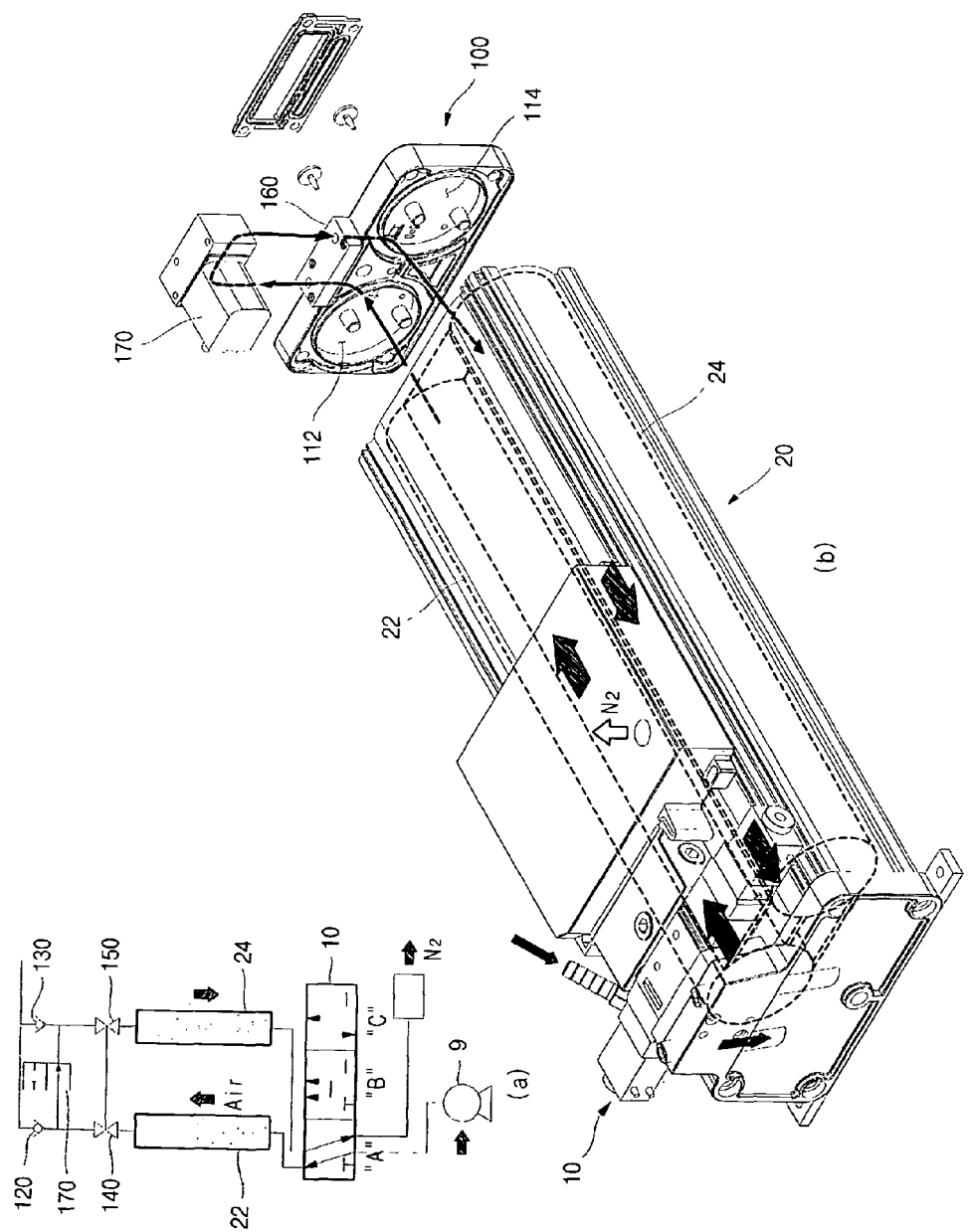

FIG. 5c illustrates the actuating state of the first upper part equalization of the oxygen concentration system according to the present invention.

As illustrated in FIG. 5c, the adsorption proceeding in a constant time followed by compressing of first adsorption column 22 by the compressed air produced by the air compressor 9 and producing the concentrated oxygen, the second solenoid valve 170 is open to communicate the first adsorption column 22 and second adsorption column 24, concurrently.

That is, as the second solenoid valve 170 actuating ON, the 2 port formed inside of the second solenoid valve 170 is opened, the concentrated oxygen of the first adsorption column 22 is moved to the fitting part 160 equipped with the second solenoid valve 170 and supplied to a port of the second solenoid valve 170 and moves to another port, then flows to the second communication hole 164 (see FIG. 1) of the second groove 114.

The concentrated oxygen flowing in the second communication hole 164 is reversal flow to second adsorption column 24 instantly, as the pressure in the first and second adsorption columns 22 and 24 become equal on a portion, and become the first upper equalization (ST300), and thus, the compressed concentrated oxygen can be reused in compressing and adsorption of the second adsorption column 24.

Figure 5D:
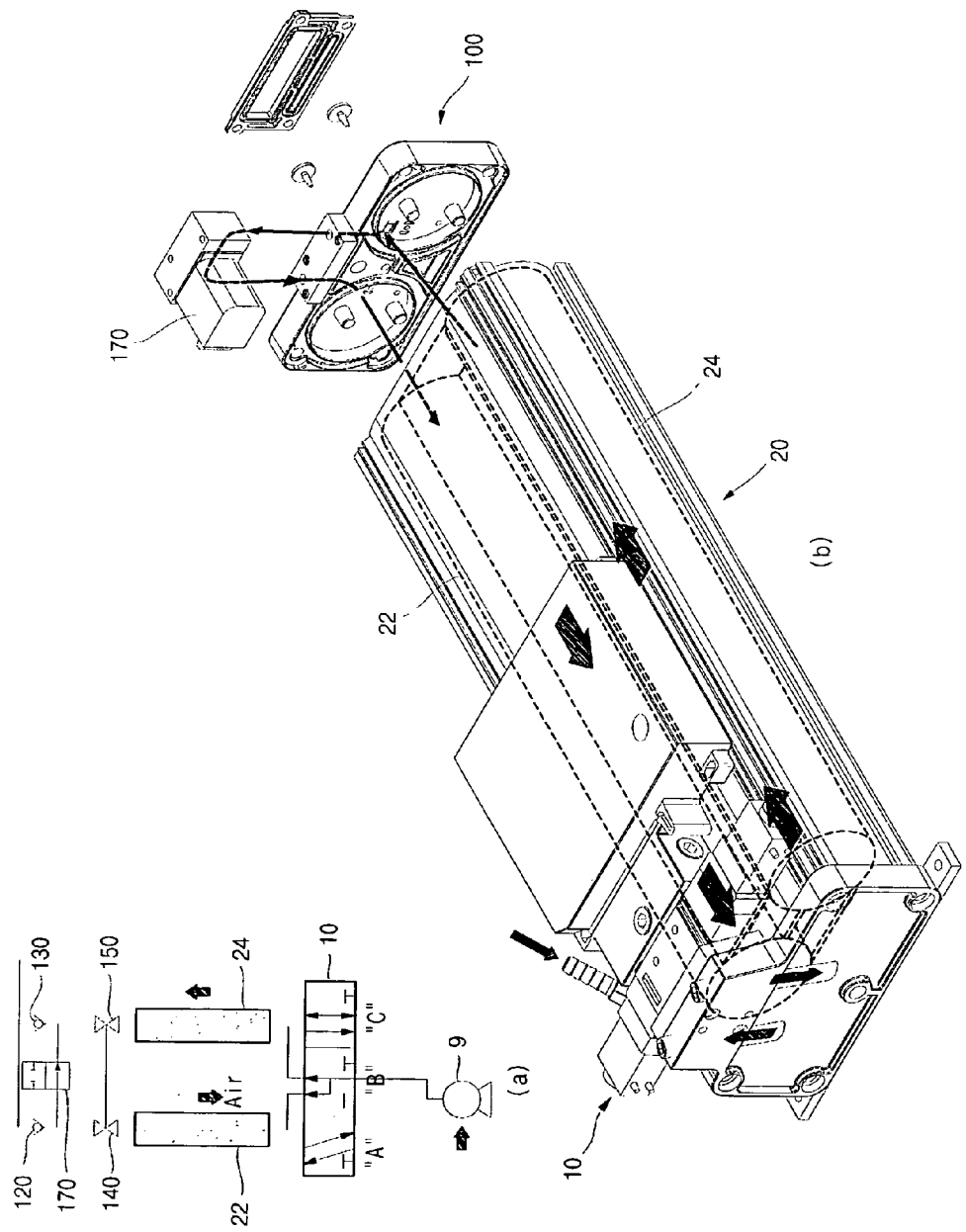

FIG. 5d illustrates the operating state of the first upper/lower part complex equalization of the oxygen concentration system according to the present invention. By the first upper/lower part complex equalization the first upper equalization and the lower equalization are accomplished at the same time.

As illustrated in FIG. 5d, the lower equalization actuating is carried out in OFF state without electric power input on the solenoid valve on (A) and (C) of the first solenoid valve 10 while, both (A) and (C) are closed, and the first adsorption column 22 with the second adsorption column 24 are in fluid communication, the compressed air of the first adsorption column 22 in a high pressure state is moved to the lower part of the second adsorption column 24 in a flash, the pressure of the first and second adsorption column 22, 24 is become equal, and the lower equalization is achieved.

The upper part equalization operating is proceeded with the lower part equalization, concurrently, the pressure of first adsorption column 22 is decreased rapidly and the pressure of second adsorption column 24 is increased rapidly, thus, the pressure of the first and second adsorption columns 22 and 24 become equal (ST400), finally.

As the compressed air moves to the first adsorption column 22 or the second adsorption column 24 and is carried out the recovery and reproduction of concentrated oxygen through the upper equalization operation, simultaneously, it can minimize the mechanical loss and improve the efficiency by reducing the operating time of air compressor 9.

Figure 5E:
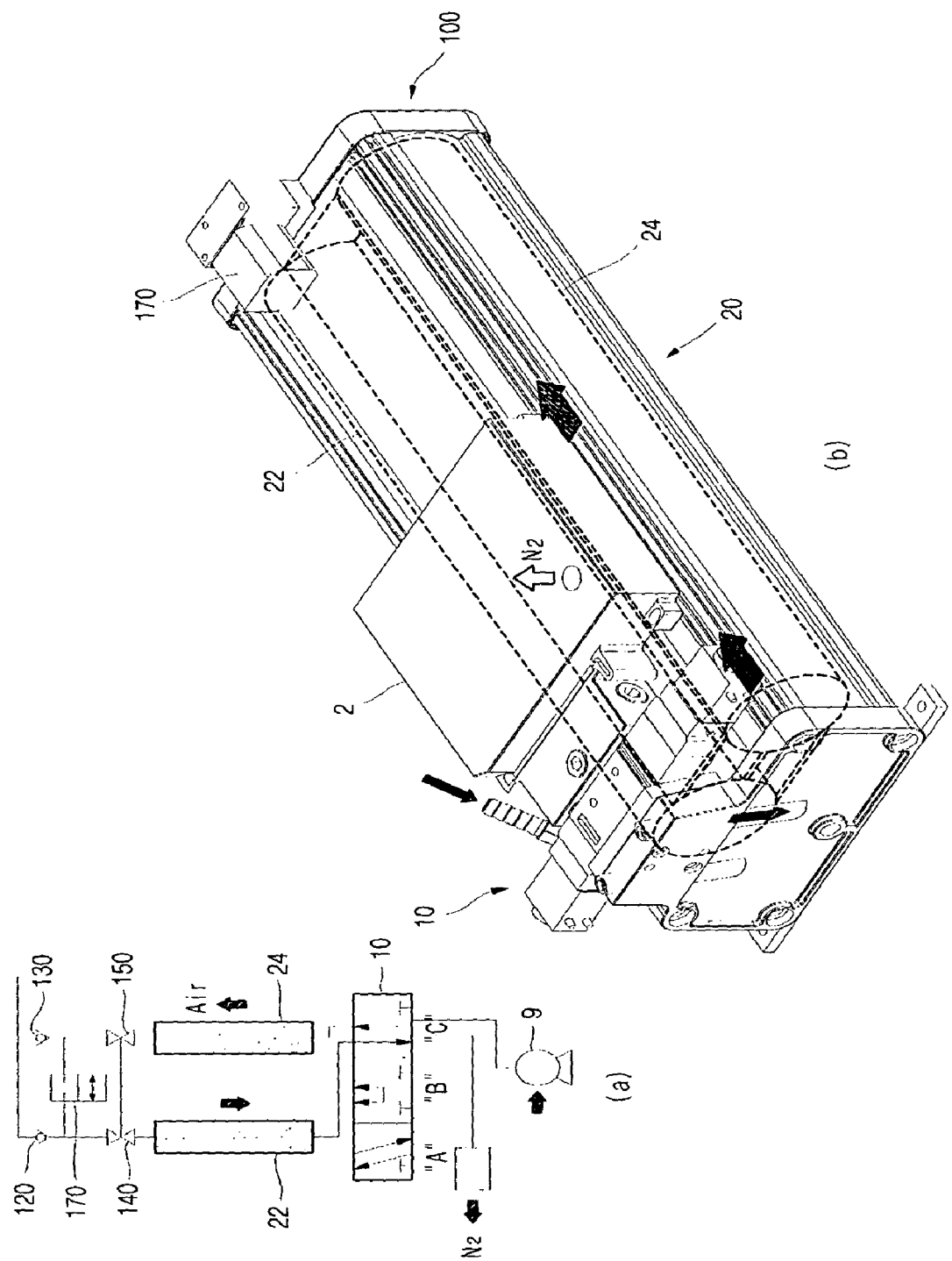

FIG. 5e illustrates the operating state of decompression of the oxygen concentration system according to the present invention.

As illustrated in FIG. 5e, the air pressurized by the air compressor 9 is supplied to the second adsorption column 24 through (C), with the solenoid valve of stage (A) of the first solenoid valve 10 in OFF state, the second adsorption column 24 is pressurized, and the continued supply of the compressed air increases the inside pressure of the second adsorption column 24, steadily, before the open operation of the second check valve 130 (see FIG. 1).

As the first adsorption column 22 is not supplied gradually with the compressed air from the air compressor, 9 thus, the first adsorption column 22 is gradually depressurized (ST500), but the second adsorption column 24 is pressurized to the state of same pressure of the oxygen reservoir 26, continuously.

As the same moment, the first adsorption column 22 connected with (C) of the first solenoid valve 10 is communicated to exhaust silencer 2, the pressure is dropped near to the atmospheric pressure.

Figure 5F:
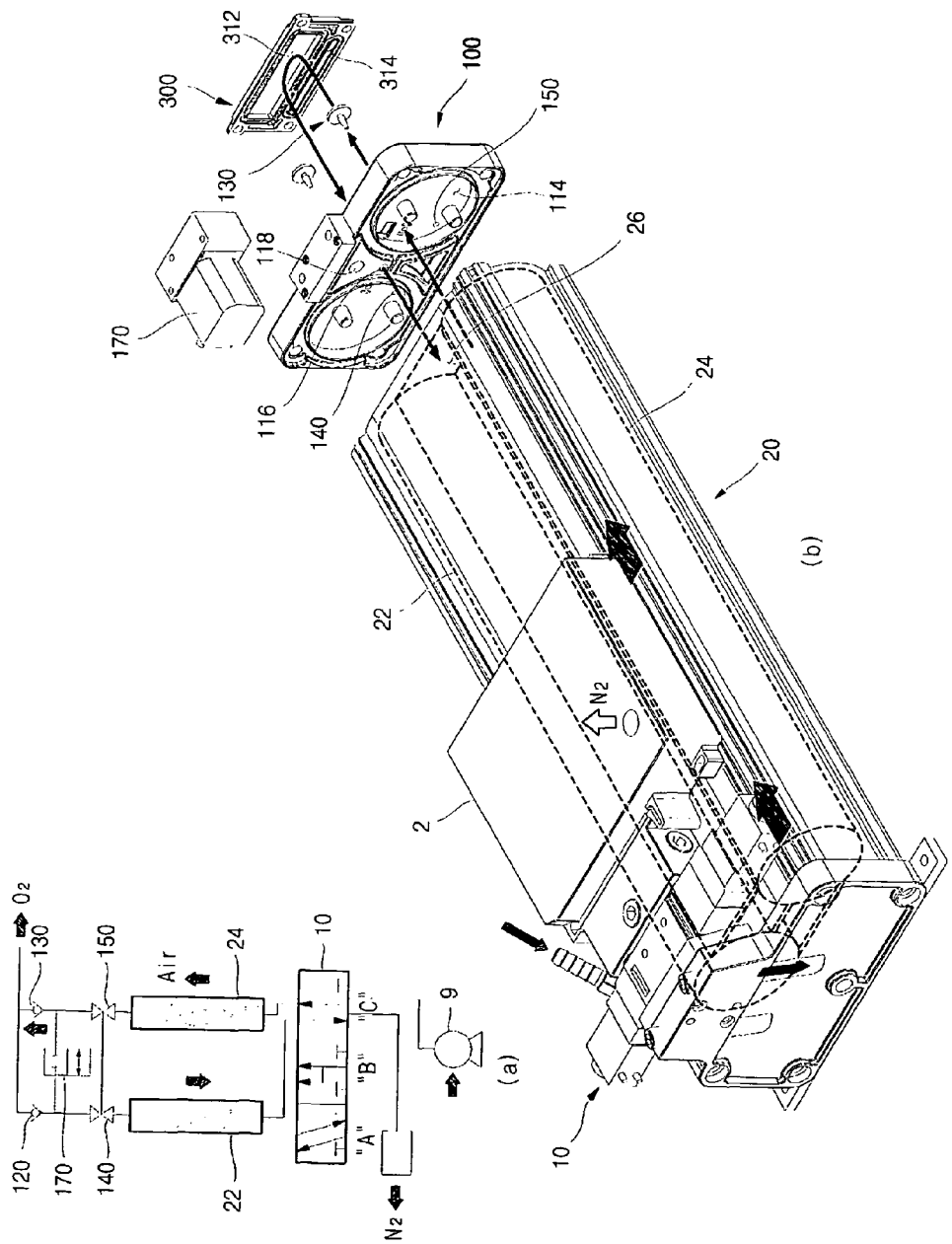

FIG. 5f illustrates the state of cleansing operation of the oxygen concentration system according to the present invention.

As illustrated in FIG. 5f, the compressed air from the air compressor 9 supplied to the second adsorption column 24 continuously, the nitrogen component is absorbed by zeolite of the second adsorption column 24 and produces the concentrated oxygen, and is supplied through the tube (not shown) and communicates with oxygen exhaust hole 118.

As the pressure of the second adsorption column 24 becomes equal to the pressure of the inside of the oxygen reservoir 26, the second check valve 130 is opened to external by the pressure of the concentrated oxygen, and the high purity concentrated oxygen flows into the first chamber 312 of the chamber part 200 (FIG. 1) through the valve hole 132.

The concentrated oxygen influx into the first chamber 312 is supplied to the oxygen reservoir 26 of the adsorption bed 20 through the supply hole 116 without leakage to outside by the sealing element 320 (FIG. 1) fitted on the chamber cover 300. At this time, a portion of the concentrated oxygen produced on the first adsorption column 22 is supplied to the second chamber 314 of the chamber part 200 through the second orifice 150 formed on the second groove 114 of the first cover plate 110 (FIG. 1).

A portion of the concentrated oxygen supplied to the second chamber 314 is supplied to the first adsorption column 22 through the first orifice 140.

As above, the concentrated oxygen supplied to the first adsorption column 22 is washing (ST600) the adsorbed nitrogen in the zeolite of the first adsorption column 22 while, the nitrogen exits through the silencer connected to the first solenoid valve 10.

The first adsorption column 22 is desorbed and washed while depressed nearly to the atmospheric pressure.

Figure 5G:
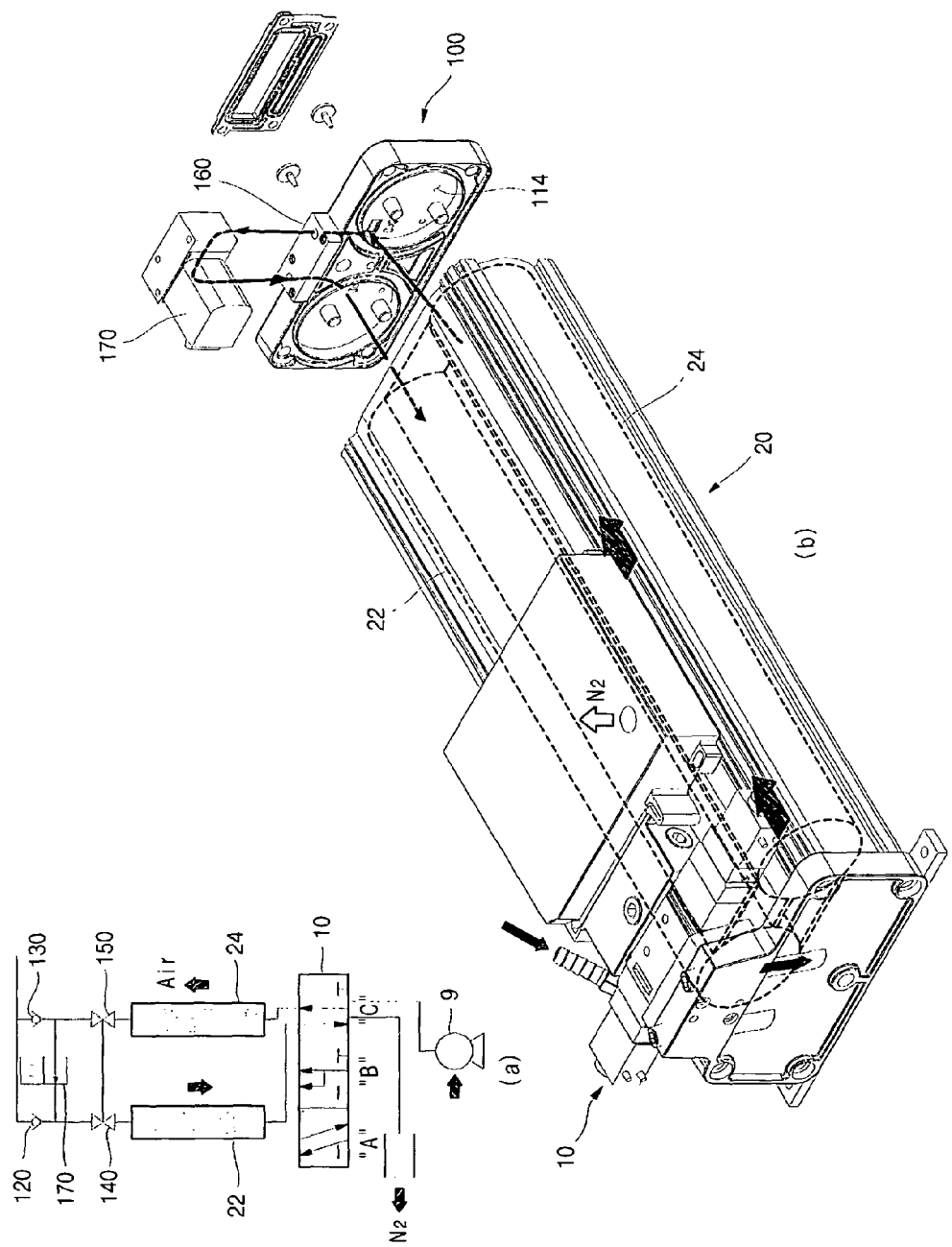

FIG. 5g illustrates the operation state of the second upper part equalization according to the present invention.

As illustrated in FIG. 5g, the concentrated oxygen produced by adsorption is proceeded constantly, followed with compressing of the second adsorption column 24 by the compressed air produced by the air compressor 9 and the second solenoid valve 170 is opened to communicate with the first adsorption column 22 and second adsorption column 24 concurrently.

That is, the electric signal is input on the second solenoid valve 170 mounted on the fitting member 160, operating to ON state and opens the 2 port, through the second communication hole 164 (FIG. 1) of the second groove 114, the concentrated oxygen of the second adsorption column 24 moves to the fitting member 160 mounting the second solenoid valve 170, supplied to another port of the second solenoid valve 170, moves to one side port and to the first communication hole 162 of the first groove 112.

The concentrated oxygen moved on the first funnel hole 162 is regurgitated into the first adsorption column 22 to become equal a part of the pressure of the first and second adsorption columns 22 and 24 as proceeds to equalization of the second upper part (ST700).

Figure 5H:
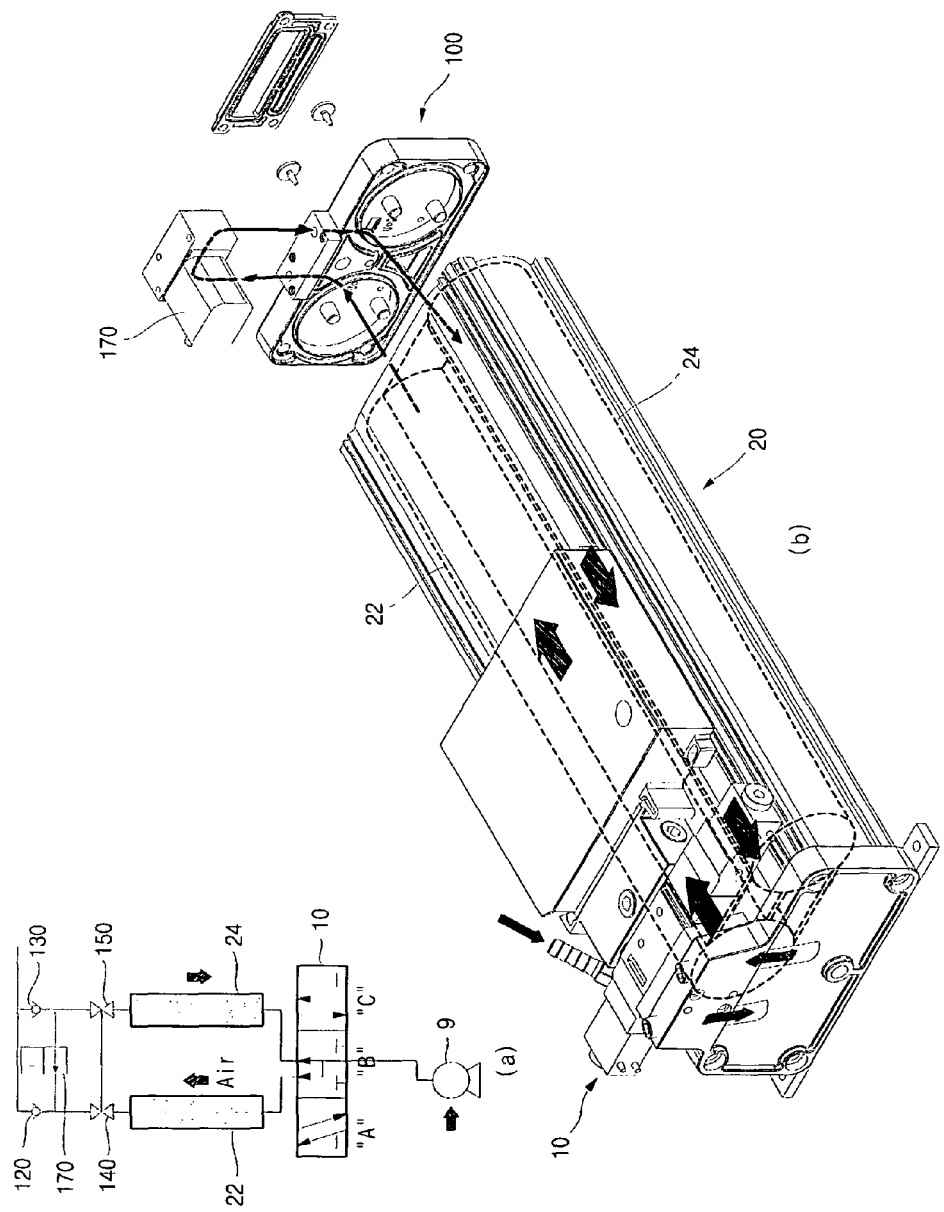

FIG. 5h illustrates the operation state of the second upper/lower part complex equalization according to the present invention.

The second upper/lower part complex equalization operation (ST800) means that the second upper equalization operation and lower equalization operations are proceeded concurrently in the state of changed the adsorption action of the first adsorption column 22 and the second adsorption column 24 described in FIG. 5d.

As illustrated in FIG. 5h, the lower part equalization operation is proceeded in the state of OFF without electric input on the solenoid valve mounted on (A) and (C) of the first solenoid valve 10, with both (A) and (C) closed, and through the position (B) the first adsorption column 22 and second adsorption column 24 are in fluid communication, and the compressed air of the second adsorption column 24 in a high pressure state moves into the direction of the lower part of the first adsorption column 22 instantly and becomes equal to the pressure of the first adsorption column 22 and second adsorption column 24 to achieve the lower part equalization.

With it, the second upper part equalization operation is proceeded simultaneously with the pressure of the second adsorption column 24 lowered rapidly and the pressure of the first adsorption column 22 elevated rapidly, the pressure of the first adsorption column 22 and second adsorption column 24 becomes equal, finally.

As described above, a part of produced gas is used to recompress through the upper part equalize operating, and the compressed air is used to recompress another adsorption column through the lower part equalization operation; thus the mechanical energy can be recovered.

Figure 6:
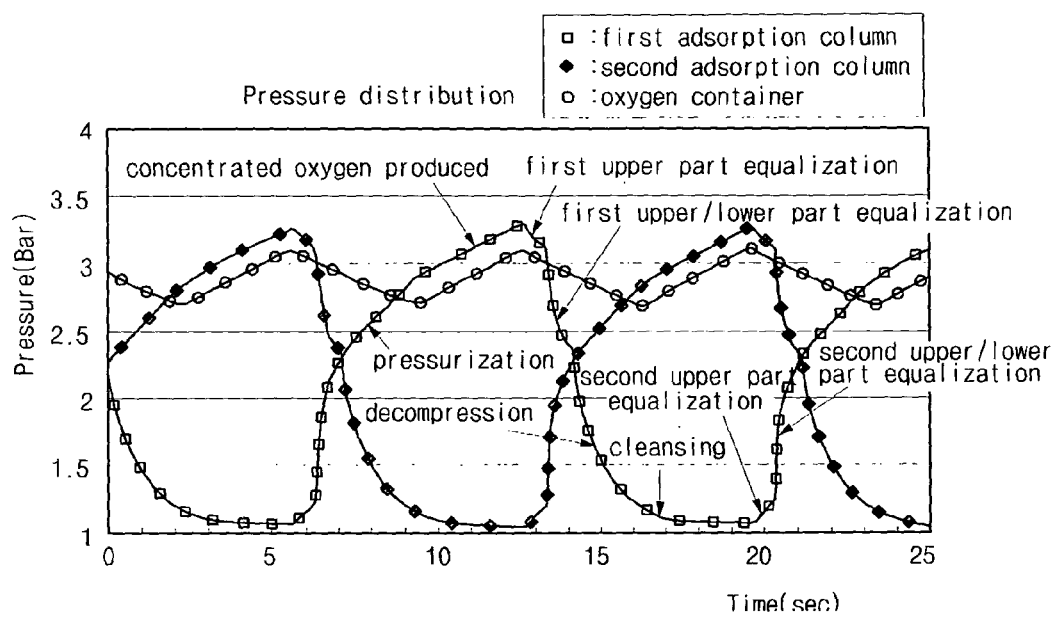
FIG. 6 is a graph of the pressure distribution chart of the oxygen concentration system according to one preferred embodiment of the present invention.

FIG. 6 illustrates a graph of pressure distribution chart according to the operation of the oxygen concentration system according to the preferred embodiment of the present invention.

As illustrated in FIG. 6, as the pressurized air followed by the operation of the air compressor 9 is supplied to the first adsorption column 22 of the oxygen container 20, the first adsorption column 22 is pressurized to a higher pressure, and the second adsorption column 24 is not supplied with the compressed air, thus the pressure is lowered slowly, and the first adsorption column 22 is pressurized continuously then, the concentrated oxygen produced in the time of the first adsorption column 22 and oxygen container 20 become an equal pressure.

The internal pressure of the first adsorption column 22 is lowered a little through the first upper part equalization after the concentrated oxygen produced in the first adsorption column 22 as above, the first and second adsorption columns 22 and 24 are communicated through the first upper/lower part equalization, and the pressure of the first adsorption column 22 is lowered rapidly and the pressure of the second adsorption column 24 is elevated higher, the pressure of the first adsorption column 22 and the pressure of the second adsorption column 24 become equal at once.

The concentrated oxygen produced in the first adsorption column 22 communicates with the silencer, and the pressure drops to the atmospheric pressure and the compressed air from the air compressor is supplied to the second adsorption column 24, and the pressure is elevated.

At the same time, the pressure of the first adsorption column 22 is lowered to near atmospheric pressure and accomplishes the desorption and cleansing, and the high purity concentrated oxygen is produced in the second adsorption column 24.

After, the high purity concentrated oxygen is produced in the second adsorption column 24, as above, the supplied compressed air on second adsorption column 24 is supplied to the first adsorption column 22, and thus, the second upper part equalization is accomplished and the upper part pressure of the first adsorption column 22 and second adsorption column 24 become equal.

As the same time, external air supplied through the lower part of the second adsorption column 24 is supplied through the lower part of the first adsorption column 22 and the second upper/lower part equalization is accomplished and the pressure of the first adsorption column 22 and second adsorption column 24 become equal.

As described above, the first and second upper/lower part evenness is accomplished, the time of compressing operation of the air compressor is shortened and the efficiency is improved while decreasing the mechanical loss.

Although preferred embodiments of the present invention have been described for illustrative purposes, those skilled in the art will be appreciated that various modifications, additions and substitutions are possible, without departing from the scope and spirit of the invention as disclosed in the accompanying claims.

What is claimed is:

1. An apparatus for concentrating oxygen comprising:
   an adsorption bed having a first solenoid valve mounted on the outside of a bed housing to supply and/or discharge compressed air;
   first and second adsorption columns disposed in the adsorption bed to separate nitrogen and oxygen in the compressed air supplied through the first solenoid valve;
   an oxygen reservoir to store the oxygen concentrated by the first and second adsorption columns;
   first and second cover assemblies mounted on first and second terminal ends of the adsorption bed; respectively, wherein the first cover assembly includes first and second grooves which are spaced from each other and positioned to correspond to the first and second adsorption columns on the inside surface of the first cover assembly;
   first and second check valves disposed at the first cover assembly in areas having the first and second grooves, respectively, for allowing the concentrated oxygen to flow through a supplying hole which is disposed in the first cover assembly and communicates with the oxygen reservoir of the adsorption bed;
   a mounting part incorporated on an upper part of the first cover assembly, the mounting part having first and second communicating holes, first ends of the communicating holes being in fluid communication with the inside of the first and second grooves, respectively, and second ends of the communicating holes extending to the outside of the first cover assembly, respectively;
   a second solenoid valve mounted on the mounting part and being in fluid communication with the first and second communicating holes so as to obtain an equilibrium in the pressure of the first and second adsorption columns; and
   a chamber installed on the outside of the first cover assembly such that the gas supplied through the first and second check valves can flow to the supplying hole.

2. An apparatus for concentrating oxygen as claimed in claim 1, wherein the first cover assembly includes first and second orifices formed through the first cover assembly on the lower sides of the first and second check valves, the first and second orifices being in fluid communication with the first and second adsorption columns for allowing a portion of the concentrated oxygen to flow in reverse direction such that the nitrogen adsorbed in the first and second adsorption columns can be purged when the pressure of any one of the first and second adsorption columns is higher than the other one.

3. An apparatus for concentrating oxygen as claimed in claim 2, wherein the first and second check valves and the supply hole are disposed on the region of the chamber while positioned on the same line, and the first and second orifices, positioned on the lower sides of the first and second check valves, are disposed on the region of the chamber while positioned on the same line.

4. An apparatus for concentrating oxygen as claimed in claim 1, wherein the first and second check valves are respectively mounted on a fixing hole formed on the first cover assembly, which includes a valve hole formed on both sides of the fixing hole to allow gas to flow, and further includes a valve body of deformable material such that the valve body can operate flexibly by the pressure of moving gas via the valve hole.

5. An apparatus for concentrating oxygen as claimed in claim 1, wherein a chamber cover is installed on the chamber of the first cover assembly, and the chamber cover defines:

a first chamber formed on the inside of the chamber cover body on the chamber of the first cover assembly and compartmented with a close region sealed from the outside; and a second chamber formed on the lower side of the first chamber and compartmented with a close region sealed from, and allowing the gas supplied through the first orifice and the second orifice to flow.

6. An apparatus for concentrating oxygen as claimed in claim 5, wherein the chamber cover includes a sealing element which is interposed along with the external edge of the first and second chambers formed on the body of the chamber cover and is positioned with an engaged state on the external peripherals of the chamber.

7. An apparatus for concentrating oxygen as claimed in claim 1, wherein the second cover assembly includes:

third and fourth grooves, which grooves correspond to the first and second adsorption columns on the inside surface of the second cover assembly, and a connecting hole formed between the third and fourth grooves and being in fluid communication with the oxygen reservoir of the adsorption bed.

8. An apparatus for concentrating oxygen as claimed in claim 1, wherein the first solenoid valve is a 5 port 3 way solenoid valve.

9. An apparatus for concentrating oxygen as claimed in claim 1, wherein the first solenoid valve is a dual 3 port 2 way solenoid valve.

10. An apparatus for concentrating oxygen as claimed in claim 1, wherein the second solenoid valve is a 2 port 2 way solenoid valve.

11. A process for concentrating oxygen to be applied for the apparatus of claim 1, comprising the steps of:

compressing external air supplied to the first adsorption column of the adsorption bed by an air compressor;

producing concentrated oxygen in the time of same pressure in both the inside of the adsorption bed and the first adsorption column as the nitrogen included in the compressed air is adsorbed in the first adsorption column;

equalizing the pressure of the first upper part of the first and second adsorption columns, by supplying the compressed gas supplied on the first adsorption column to the second adsorption column of the adsorption bed by opening the second solenoid valve in response to a first electrical signal after production of the concentrated oxygen in the first adsorption column;

equalizing the first upper/lower part, accomplished with the first and second adsorption columns to equalize with the first upper part equalization and lower part equalization concurrently, by supplying the external air supplied by the step of the first upper part equalization through the lower part of the first adsorption column through the lower part of the second adsorption column by opening the first solenoid valve in response to a second electrical signal;

decompressing the first adsorption column by reducing its pressure without supplying the compressed external air to the first adsorption column while supplying the compressed external air to the second adsorption column through the air compressor to the inside of the adsorption bed and elevating the internal pressure of the second adsorption column;

cleansing accomplished with desorption and rinsing with the pressure of the first adsorption column in the state of decompressed nearly to the atmospheric pressure, wherein the nitrogen substance contained in the compressed air is adsorbed in the second adsorption column and a high concentrated oxygen is produced in the time of same pressure with the inside pressure in both the adsorption bed and the second adsorption column;

equalizing the pressure of the second upper part, wherein the supplied compressed gas on the second adsorption column is supplied to the first adsorption column installed inside the adsorption bed by opening the second solenoid valve in response to the first electrical signal after the producing the concentrated oxygen at the second adsorption column to equalize the upper part pressure of the first and second adsorption columns; and equalizing the second upper/lower part equalization, accomplished concurrently with the lower part equalization and the second upper part equalization of the first and second adsorption columns, by supplying the external air through the lower part of the second adsorption column through the lower part of the first adsorption column by opening the second solenoid valve in response to the second electrical signal.

12. A process for concentrating oxygen as claimed in claim 11, wherein the step of producing the concentrated oxygen includes a step of storing the concentrated oxygen where high concentrated oxygen produced in the first adsorption column is stored within the adsorption bed.

13. A process for concentrating oxygen as claimed in claim 11, wherein in the steps of the first and the second upper/lower part equalization, the pressure of the first adsorption column is lowered rapidly and the pressure of the second adsorption column is elevated rapidly, and the pressure of the first and second adsorption columns reaches to a same pressure.

14. A process for concentrating oxygen as claimed in claim 11, wherein the step of the first upper/lower part equalization is accomplished concurrently and continuously when the step of the first upper part equalization is established.

15. A process for concentrating oxygen as claimed in claim 11, wherein the step of the second upper/lower part equalization is accomplished concurrently and continuously when the step of the second upper part equalization is established.

* * * * *